May 6, 1924.

J. W. SUMNER ET AL 1,492,764

FLUID PRESSURE BRAKE

Filed June 7, 1923

WITNESS:
H. Sherburne

INVENTORS
J. W. Sumner
A. G. Rayburn
BY White Prost & Evans
their ATTORNEYS

Patented May 6, 1924.

1,492,764

UNITED STATES PATENT OFFICE.

JAMES W. SUMNER AND ALDEN G. RAYBURN, OF LOS ANGELES, CALIFORNIA, ASSIGNORS TO EMORY WINSHIP, OF SAN FRANCISCO, CALIFORNIA.

FLUID-PRESSURE BRAKE.

Application filed June 7, 1923. Serial No. 643,876.

*To all whom it may concern:*

Be it known that we, JAMES W. SUMNER and ALDEN G. RAYBURN, citizens of the United States, and residents of the city and county of Los Angeles, in the State of California, have invented a new and useful Fluid-Pressure Brake, of which the following is a specification.

This invention relates to a vehicle brake operated by fluid pressure and adapted to produce a frictional resistance upon some moving element connected to a rotating axle. More particularly the invention is concerned with a fluid pressure brake in which the extent of operation of the brakes may be manually controlled. Fluid pressure brakes find one of their most important uses in connection with parts which are relatively bodily movable with respect to the part on which the brake actuating means are mounted, such as the front or dirigible wheels of automobiles and motor trucks and the wheels of trailers. In these instances the actuating means or controlling means is necessarily arranged on the frame of the automobile or tractor. To apply a lever system for the transmission of the braking force to the brake drums of the front wheels or the trailer involves necessarily a highly complex mechanical arrangement which is entirely obviated by the use of fluid pressure. For supplying the fluid pressure, it is merely necessary to provide a sufficiently flexible conduit to take care of whatever relative movement that may occur between the parts.

It is one of the objects of our invention to improve in general the construction and operation of such brakes, so that they may be reliable in service and simple to operate.

It is another object of our invention to make it possible to produce the necessary fluid pressure by the aid of a power cylinder and piston which is manually controlled. In this connection it is a further object of our invention to utilize the effect of the vacuum created in the intake of an internal combustion engine serving to drive a vehicle, for operating this power cylinder for forcing the fluid to the desired points.

It is still another object of our invention to provide a braking system in which liquid such as oil under pressure is used, and in which the extent of application of the brakes may be nicely controlled by determining the extent of movement of the piston in the vacuum cylinder, which serves as the source of power to produce the liquid pressure.

Our invention possesses other advantageous features, some of which, with the foregoing, will be set forth at length in the following description, where we shall outline in full that form of the invention which we have selected for illustration in the drawings accompanying and forming part of the present specification. Although we have illustrated in the drawings but one form of our invention, we do not desire to be limited thereto, since the invention as expressed in the claims may be embodied in other forms also.

Referring to the drawings:

Figure 4 is a sectional detail view of a valve utilized in the system of Fig. 1;

Figure 2:
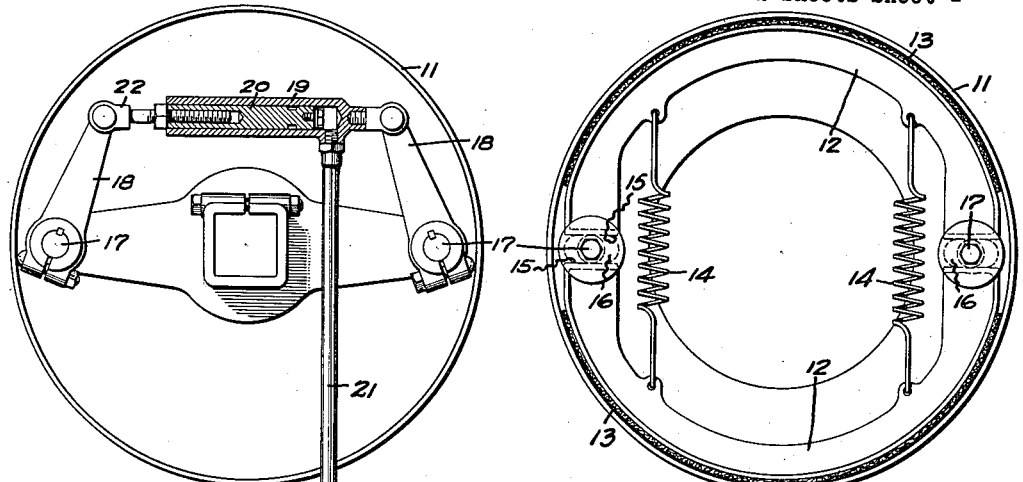
Figure 2 is a diagrammatic view of a brake that may be used with the system of Fig. 1.

The brakes, of which there may be the desired number, may be constructed in any appropriate manner so as to be operated by liquid under pressure. In the present instance, there is illustrated, in Figs. 1 and 2, a type of brake that includes a stationary drum 11, within which is disposed a pair of shoes 12 having a brake lining 13. These shoes are connected by tension springs 14 so that they are urged inwardly and away from the braking inner surface of drum 11. In order to overcome this spring tension and apply the brake shoes against the drum 11, these shoes have faces 15 which cooperate with cams 16 arranged to be rotated as by the aid of the rods 17 attached thereto and rotatably mounted on the head of drum 11. These cams may conveniently be made in the form of a flat bar interposed between opposed surfaces 15 of the shoes 12, as most clearly illustrated in Fig. 2. It is evident that the springs 14 have a tendency to keep the cams 16 in such a position that their smallest dimension only separates these surfaces. Upon rotating these cams however, the surfaces 15 become further separated, and the brakes are set, the extent of separation determining the braking force which is exerted.

Figure 1:
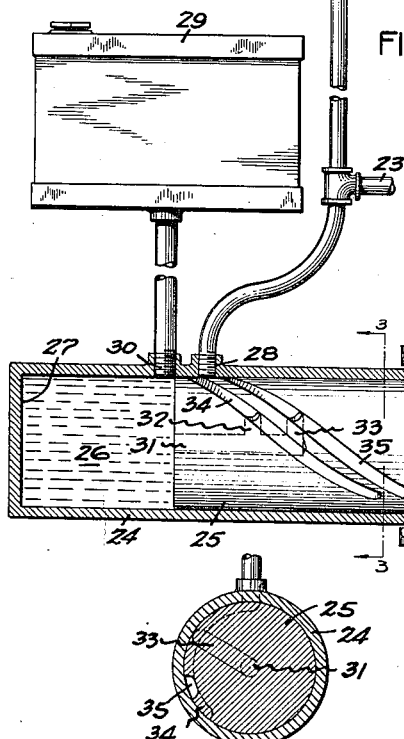
Figure 1 is a diagrammatic view, mainly in section, of a braking system embodying our invention.
Figure 3:
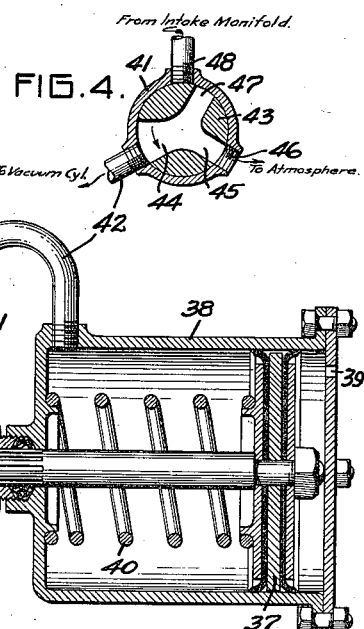
Figure 3 is a detail sectional view, taken along the plane 3—3 of Fig. 1.

The manner in which fluid or liquid pressure may be utilized to effect rotation of cams 17 is illustrated in Fig. 1, in which there are shown the lever arms 18 keyed or otherwise fastened to the rods 17. A fluid pressure cylinder 19 and its piston 20 are connected to these arms in such a way that the introduction of a fluid under pressure within the cylinder 19, as by the aid of conduit 21, causes rotation of levers 18. For this purpose the arrangement may conveniently take the form illustrated in Fig. 1, in which the piston 20 is mechanically pivoted as by the aid of the eye 22, to one of the levers 18, while the cylinder 19 is similarly attached to the other arm 18. The view in Fig. 1 is taken from the opposite side of drum 11, as compared with Fig. 2. It is evident that movement of the cylinder and piston outwardly relative to each other, in response to the exertion of a fluid pressure in the cylinder, causes the arms 18 to rotate the cams 17.

The conduit 21 which supplies fluid such as oil under pressure to cylinder 19 represents but one of several such conduits all communicating with cylinders similar to cylinder 19, and all arranged to be supplied simultaneously with fluid under pressure. In order to indicate this feature on the drawings without unnecessary repetition, a connection 23 leading to the same source as conduit 21, is shown. This connection may be used to operate a brake such as just described. Other additional branched off conduits may also be utilized. Ordinarily four braking cylinders, one for each wheel of the vehicle are all that is required. Since these conduits 21 or 23 may be made of flexible material, there is no difficulty in applying the brakes on the front wheels of an automobile by proper conduit connection thereto, or in fact to one or more trailers that may be connected to the controlling vehicle by a drawbar.

The means for forcing fluid under pressure into the brake cylinders 19 through such conduits as 21 and 23, is preferably a piston and cylinder arrangement. The cylinder 24, provided with a piston 25, shown diagrammatically in Fig. 1, may perform this function, and for this purpose oil 26 is supplied to the cylinder chamber between the active end of piston 25 and the head 27 of the cylinder. A port 28 in the cylinder wall provides a passageway from the interior of the cylinder to the conduits 21, 23, etc., in a manner to be later described. A tank 29 serving as an oil reservoir, connects to the cylinder 24 by aid of a port 30. This tank serves to replenish the oil in the cylinder 24 in case any should be lost by leakage or otherwise. The port 30 is so located that communication between the reservoir 29 and the cylinder 24 is effected only when the brakes are in the released position shown in Fig. 1, and with the piston 25 in a position farthest from the cooperating head 27 of the cylinder.

With this invention it is possible to determine, on the part of the operator, how far the piston 25 may be forced toward the head 27, and thus also the pressure that is produced by the oil in the brake cylinders 19. The operator by controlling the mechanism that applies force to this piston also causes a limit to be set to the axial movement thereof relative to the cylinder 24. To this end, we preferably arrange matters in such a way that the port opening 28 is controlled by the movement of the piston 25 therein; in other words, this port may be closed by the piston itself at a predetermined point of its axial travel in the cylinder 24. When the port is thus closed by the piston 25, the oil or other liquid in the brake cylinders 19 is held under pressure; and such conditions may be maintained until the operator performs a controlling function either to cause the brakes to be released, or to apply them with greater force.

To secure this mode of operation, the piston 25 is provided with ports or passageways for conducting the oil 26 from the cylinder 24 to the brake cylinders 19 by way of port 28. One of these ports is the axial passageway 31 extending from the active end of piston 25 to an interior point thereof. Communicating with this port or passageway are a pair of substantially radial openings 32 and 33 which in turn communicate with grooves 34 and 35 cut in the periphery of the piston 25 and describing a substantially helical path thereon. The distance between the two grooves 34 and 35 measured in a direction parallel to the axis of the piston 25 is substantially equal to the port opening 28. Furthermore the piston 25 is of course rotatable about its axis, and by rotating it to any desired extent, it is possible to choose what portions of the grooves 34 or 35 may be active to connect the port 28 with the cylinder 24, by way of openings 31, 32 and 33.

Let us assume that the piston 25 is in its extreme right hand position, as illustrated in Fig. 1, and that for this position the port 28 falls centrally between the two grooves 34 and 35 near their extremities. For this condition also let us assume that oil fills the cylinders 19 and the conduits 21, 23, etc., completely, but is not under pressure, although this trapped oil is out of communication with the cylinder 24 for the port positions shown. Now if a force be applied to the piston tending to urge it to the left, no appreciable movement of the piston would result, since there is no means of escape for the oil 26 which is trapped in the cylinder. In order that such a force may be rendered active, it is necessary to rotate the piston 25 a slight amount so as to put port 28 into communication with the passageways 31, 32 and 33 by way of one of the grooves 34, 35. Should the piston 25 be rotated in a clockwise direction as viewed from the right hand side of Fig. 1, the groove 34 will be brought into communication with port 28. When this occurs the force tending to urge piston 25 to the left becomes active, some of the oil 26 being forced out into the conduits 21, 23, etc., and a braking force is thereby applied. The axial movement of the piston 25 continues to the left until the groove 34 has passed just beyond the port 28. To produce further movement of the piston in this direction for applying more liquid pressure to the brakes, a further clockwise rotation of piston 25 is necessary. By gradually rotating the piston, therefore, it is possible to cause a corresponding axial movement thereof. In other words, the axial movement of the piston is a function of its rotational movement. Ordinarily to apply the brakes therefore to any desired extent, and assuming that the force tending to move the piston axially to the left is always available, it is merely necessary to rotate the piston to the desired extent for accomplishing this purpose. Since the force urging the piston to the left causes it to move substantially immediately upon communication being established between the groove 34 and the port 28, it will be seen that what actually happens is a smooth helical motion described by the piston, similar to that described by a screw as it is turned in a threaded aperture.

Figure 5:
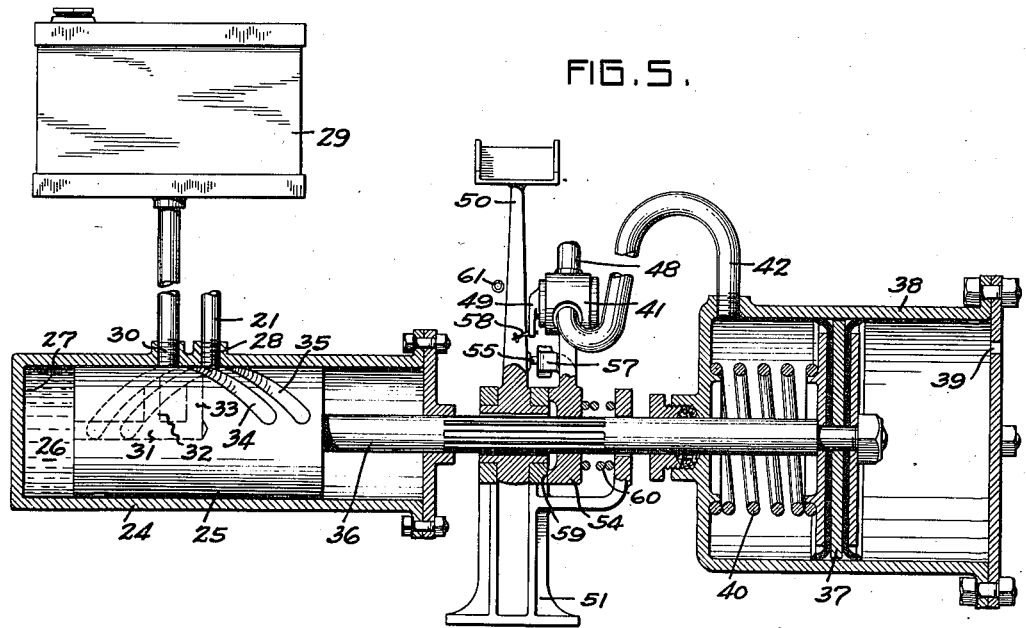
Figure 5 is a view similar to Fig. 1, but illustrating the position of the parts when the brakes are set to some extent.

In Fig. 5 an intermediate position of the piston 25 within the cylinder 24 is illustrated. Here the port 28 has just passed away from communication with an intermediate portion of groove 34, the piston 25 having been rotated through about one half of its maximum angular freedom of movement. The oil in the brake cylinders 19 is thus under intermediate pressure. To increase the pressure, the piston 25 is rotated still further in a clockwise direction to any desired extent, and the piston moves to a corresponding extent to the left and forces more oil to the brake cylinders.

The groove 35 and the passageway 33 is provided to permit release of the brakes. For this purpose the direction of the force tending to move the piston 25 axially must be reversed. In other words, a force tending to move the piston to the right must be used. Assuming that the position of the mechanism is that shown in Fig. 5, the brakes may then be gradually released by rotating the piston 25 in a counter-clockwise direction, or that opposite to the direction for applying the brakes. A slight rotation of piston 25 will serve to bring groove 35 into communication with port 28, and escape of oil back into cylinder 24 follows, until the resultant axial movement of piston 25 to the right interrupts the communication. When this happens the piston is maintained in this position, until rotation thereof in one or the other direction serves to place either of grooves 34 or 35 into communication with port 28.

Figure 6:
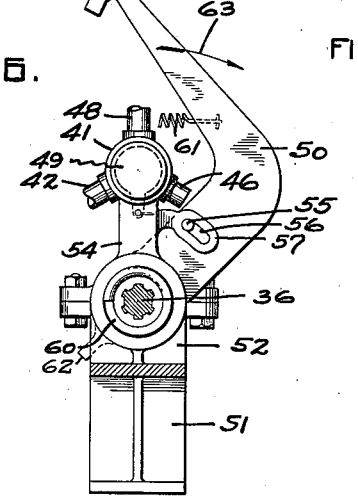
Figure 6 is a sectional view along plane 6—6 of Fig. 1, and illustrates the manual controlling devices used in the system.

The provision of separate grooves 34 and 35 for the application and release of the brakes is essential so that the opposite directions of rotational movement of piston 25 may have opposite controlling effects upon the system. Furthermore it is advantageous so to arrange the manual control that the usual brake pedal may be used, whereby depression thereof causes application of the brakes, and the release thereof causes a release of the brakes, the extent of application and release being dependent upon the position of the pedal. In Figs. 1 and 6 one form of mechanism is diagrammatically illustrated whereby these effects are obtained. In addition the pedal arrangement is caused to control the force that tends to move the piston 25 axially.

In the present arrangement, this axial force is transmitted by the aid of a piston rod 36, which is shown as directly connected to a piston 37 disposed in a cylinder 38. This piston 37 is arranged to be actuated by differences in air pressure on its opposed faces. The right hand face is constantly exposed to atmospheric pressure, there being a vent 39 in the right hand side of the cylinder for this purpose. A spring 40 urges the piston normally to the right, and if the air pressure in the left hand side of the cylinder 38 is not materially less than atmospheric, then the spring 40 may be utilized to urge both pistons 25 and 37 to the right, or in a direction to release the brakes. In order to overcome the force of this spring, and to provide a force tending to move the pistons 25 and 37 to the left for applying the brakes, the left hand side of the cylinder 38 may be placed in communication to a suction source that reduces the air pressure on this side. The result is that the preponderance of pressure on the right hand side of piston 37 may be made large enough to compress the spring and cause movement of the pistons to the left. The suction source in the present instance may conveniently be the intake manifold of the internal combustion engine, which serves to drive the vehicle. To effect communication between the intake manifold and this cylinder 38, a valve 41 is provided, located in the conduit 42, which is made preferably of flexible material for a purpose that will be described hereinafter. This valve is illustrated most clearly in Fig. 4, and although it may take many equivalent forms, it is arranged so that for one position it serves to connect the cylinder 38 with the intake manifold, and in another position, to atmosphere. In the position shown the rotatable portion 43 of the valve is in such a position that the vacuum cylinder 38 is connected by aid of ports 44 and 45, with the atmosphere. Upon a slight rotation of valve member 43 in a counter clockwise direction, the port 45 moves out of alinement with stationary port 46 communicating to atmosphere. At the same time another port 47 also in communication with the port 44, moves into communication with the stationary port 48, which leads to the intake manifold. It is thus evident that a slight relative rotation between the members 41 and 43 serves to determine the condition of pressure in the left hand side of cylinder 38. A handle or lever arm 49 is attached to the member 43 for operating the valve.

Figure 7:
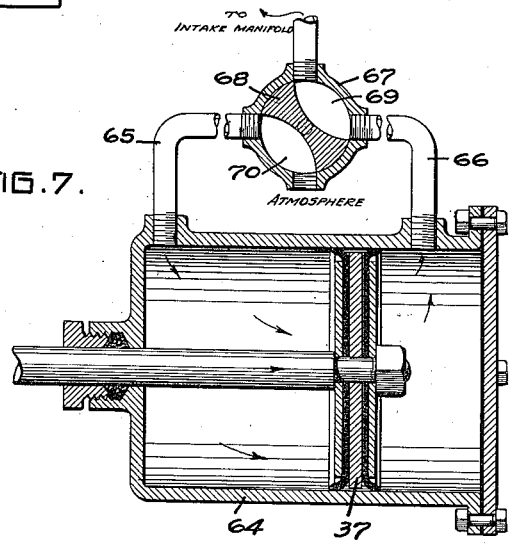
Figure 7 is a sectional view of a portion of a modified form of our invention.

While in Fig. 1, we illustrate a cylinder 38 in which one direction of movement is caused by a spring 40, it is possible to arrange this cylinder in such a way that a difference of pressure may be used to move the piston 37 in either direction. Such a scheme is illustrated diagrammatically in Fig. 7, in which a cylinder 64 has two port conduits 65 and 66 on opposite sides of the piston 37. Either of these conduits may be connected to the intake manifold, while the other will be connected to atmosphere. For this purpose a slightly modified form of control valve 67 is used. In this valve the movable member 68 forms connecting passageways 69 and 70, which in the position shown, serves to connect conduit 65 to atmosphere, and conduit 66 to the intake manifold. For this condition the piston will be urged toward the right by the excess of pressure in the left hand side of the cylinder. Rotation of the member 68 through a definite angle will serve to reverse these conditions.

The pedal 50, similar in appearance to the conventional automobile brake pedal, may be conveniently utilized for operating the valve 41 or 67, as well as for rotating the piston 25 to determine its extent of movement. For this purpose a bearing standard 51 is provided, which has lugs 52 attached to it in any appropriate manner for rotatably supporting the hollow hub 53 of the pedal 50, at each end. This hub clears the piston rod 36 so that it may readily slide in an axial direction relatively to the pedal. Splined to the rod is a lever member 54 which has a lost motion connection with the pedal 50. In the present instance this lost motion connection is illustrated as a slot and pin arrangement, the pin 55 being carried by the pedal, and the slot 56 being formed in a lug 57 carried by the arm 54. By the aid of this lost motion connection between the pedal 50 and the piston 25, the initial movement of the pedal may be utilized to control the valve 41 or 67 without affecting the angular position of the piston. In other words, the piston 25 is not rotated angularly about its axis by movement of the pedal 50 until after a force is initiated in the power or vacuum cylinder 38 or 64 of the proper direction for moving the piston 25 axially.

There is a mechanical connection, therefore, between the pedal 50 and the lever 49 of the valve 41 or 67, which is so arranged that only the initial reversing movement of the pedal 50 is used for actuating the valve. For this purpose the valve 41 or 67 is carried by the arm or lever 54, as shown most clearly in Fig. 6, and there is a rod 58 which connects the arm 49 with the pedal 50. Therefore, while there is relative rotation between arm 54 and pedal 50, the rod 58 operates to operate the valve 41 or 67, but as soon the the pin 55 reaches the extremity of the slot 56 there is no further relative movement between the pedal and this arm, and the pedal, arm and valve rotate as a unit. In order to make sure that the valve 41 or 67 will be operated before the arm 54 moves, there is provided an arrangement for frictionally maintaining this arm against movement until such time as pin 55 contacts with the end of slot 56. For this purpose the arm 54 is provided with a friction surface 59 concentric with its hub and urged into frictional contact with a stationary part of the mechanism, such as the lug 52. A spring 60 supplies the force for urging this surface toward the face of the lug. The usual tension spring 61 may also be provided for pulling the pedal 50 to the released position upon withdrawal of the foot therefrom. Furthermore as is well understood, stops 62 limiting the movement of the pedal may also be used.

The operation of the control pedal 50 may now be described. Let us assume that the pistons 25 and 37 are in the position of Fig. 1, with the pedal 50 in its released position of Fig. 6. The brakes are then also in the released position. Depression of pedal 50 in the direction of arrow 63 at first rotates the valve member 43 from the position shown in Fig. 4 to that in which ports 47 and 48 are in alinement. The passageway from the intake manifold to the cylinder 38 is thus unimpeded, and a force is created tending to urge the piston 37, as well as the rod 36 and piston 25, to the left. No such movement, however, can take place until pin 55 strikes the right hand edge of slot 56; then upon further movement of the pedal 50, the arm 54 and its associated parts move in unison with the pedal. The rod 36 is thus rotated in a clockwise direction, and groove 34 is brought into registry with port 28. The piston 25 now moves to the left, and continues to do so until it covers the port 28. The position of the parts is now somewhat like that illustrated in Fig. 5. If the pedal 50 be further depressed, the piston 25 will move further to the left, and the force necessary to do this will be provided by the cylinder 38, since the valve 41 will still be in a position to connect the intake manifold to the cylinder.

Now if it be desired to release the brakes partially or entirely, the pedal 50 is permitted to move in a counter-clockwise direction. The first part of this movement, due to the slot and pin connection, will serve to move the valve 41 to the position of Fig. 4, and both sides of cylinder 38 will be open to atmosphere. The spring 40 will now tend to urge the piston 37, rod 36, and piston 25 to the right, but these parts will not move until the pedal has rotated far enough to bring the pin 55 into contact with the end of the slot 56, as shown in Fig. 6. Further movement of the pedal in a counterclockwise direction will serve to rotate the piston 25, and groove 35 will be placed into communication with port 28. Release of the brakes can now take place, the piston 25 receding to the right. If the pedal 50 be allowed to come back all the way to the position of Figs. 1 and 6, the brakes will be entirely released.

From the foregoing description it is evident that the control of the amount of braking is a comparatively simple matter, and may be accomplished by simply depressing the pedal 50 to any desired extent, as in ordinary manual braking.

We claim:

1. In a fluid pressure brake for vehicles, a brake cylinder for operating the brakes, and means for supplying fluid under pressure to said brake cylinder, comprising a cylinder adapted to contain the fluid medium, a piston in said cylinder, said piston and cylinder having cooperating ports for transmitting the fluid to and from the brake cylinder, whereby axial movement of the piston in the cylinder serves to operate the ports, and means for urging the piston in an axial direction.

2. In a fluid pressure device, a cylinder and a piston axially movable with respect to the cylinder, said cylinder and piston having cooperating ports on their peripheries for establishing communication between the cylinder chamber and an external point, said ports being so arranged that a definite movement of the piston within the cylinder serves to interrupt this communication.

3. In a fluid pressure device, a cylinder and a piston axially movable with respect to the cylinder, said cylinder having a port on its periphery and the piston having a passageway communicating with the cylinder chamber and the periphery of the piston, whereby upon movement of the piston to a proper position in the cylinder, the port openings may be interrupted, and means whereby the cooperative relationship between the ports in the cylinder and piston may be varied to provide for any selected degree of movement of the piston in the cylinder.

4. In a fluid pressure device, a cylinder, a piston axially and rotatably movable with respect to the cylinder, said cylinder having a port in its periphery, and the piston having a port communicating with the cylinder chamber, one of said ports forming a slanting groove on the periphery, said groove cooperating with the other port, and means for rotating the piston, whereby the extent of axial movement of the piston is controlled by the extent of the rotational movement.

5. In a fluid pressure device, a cylinder, a piston axially and rotatably movable with respect to the cylinder, said cylinder and piston having cooperating ports in their peripheries, the piston port communicating with the cylinder chamber, and one of the ports comprising slanting peripheral grooves, said grooves being separated by a distance substantially great enough so that the cooperating port may be disposed between them without having appreciable communication with either, and means for rotating the piston in the cylinder.

6. In a fluid pressure brake system for a vehicle, a brake cylinder for operating the brakes, a fluid pressure cylinder for supplying fluid under pressure to said brake cylinder, a piston axially movable with respect to the fluid pressure cylinder, means for applying a force to the piston so as to move it axially of the fluid pressure cylinder, said fluid pressure cylinder having a port on its periphery in communication with the brake cylinder, the piston having a passageway communicating with the fluid pressure cylinder chamber and the periphery of the piston, whereby upon movement of the piston to a proper position in the fluid pressure cylinder, the port openings may be interrupted, and means whereby the cooperative relationship between the ports in the fluid pressure cylinder and the piston may be varied to provide for any selected degree of movement of the piston in the fluid pressure cylinder.

7. In a fluid pressure brake system for a vehicle, a brake cylinder for operating the brakes, a fluid pressure cylinder for supplying fluid under pressure to said brake cylinder, a piston rotatably and axially movable with respect to the fluid pressure cylinder, means for applying a force to the piston so as to move it axially of the fluid pressure cylinder, said fluid pressure cylinder and piston having cooperating ports in their peripheries, the cylinder port being in communication with the brake cylinder and the piston port communicating with the fluid pressure cylinder chamber, one of the ports comprising a slanting peripheral groove, said groove cooperating with the other port, and means for rotating the piston, whereby the extent of axial movement of the piston is controlled by the extent of the rotational movement.

8. In a fluid pressure brake system for a vehicle, a brake cylinder for operating the brakes, a fluid pressure cylinder for supplying fluid under pressure to said brake cylinder, a piston rotatably and axially movable with respect to the fluid pressure cylinder, means for applying a force to the piston so as to move it coaxially of the fluid pressure cylinder in either direction, said fluid pressure cylinder and piston having cooperating ports in their periphery, the cylinder port communicating with the brake cylinder, and the piston port communicating with the fluid pressure cylinder chamber, and one of the ports comprising slanting peripheral grooves, said grooves being separated by a distance substantially great enough so that the other port may be disposed between them without having appreciable communication with either, and means for rotating the piston in the fluid pressure cylinder.

9. In a fluid pressure brake system for a vehicle driven by an internal combustion engine having an intake manifold, a vacuum cylinder adapted to be connected to the intake manifold, a piston in said cylinder, means urging the piston in the direction opposed to that occasioned by the connection of the cylinder to the intake manifold, a fluid pressure cylinder for producing pressure in a liquid, a piston for the fluid pressure cylinder operated by the vacuum cylinder piston, and a brake cylinder utilizing the fluid pressure produced in the fluid pressure cylinder.

10. In a fluid pressure brake system for a vehicle, a brake cylinder for operating the brakes, a fluid pressure cylinder for supplying fluid under pressure to said brake cylinder, a piston axially movable with respect to the fluid pressure cylinder, means for applying a force to the piston so as to move it axially of the fluid pressure cylinder, said fluid pressure cylinder and piston having ports on their peripheries, the cylinder port being in communication with the brake cylinder, the piston port communicating with the fluid pressure cylinder chamber, and with the periphery of the piston, whereby upon movement of the piston to a proper position in the fluid pressure cylinder, the port openings may be interrupted, and a brake pedal for varying the cooperative relationship between the ports in the fluid pressure cylinder and the piston, whereby any selected degree of movement of the piston in the fluid pressure cylinder may be provided.

11. In a fluid pressure brake system for a vehicle, a brake cylinder for operating the brakes, a fluid pressure cylinder for supplying fluid under pressure to said brake cylinder, a piston rotatably and axially movable with respect to the fluid pressure cylinder, means for applying a force to the piston so as to move it axially of the fluid pressure cylinder, said fluid pressure cylinder and piston having cooperating ports in their peripheries, the cylinder port being in communication with the brake cylinder, and the piston port communicating with the fluid pressure cylinder chamber, one of said ports comprising a slanting peripheral groove, said groove cooperating with the other port, and a brake pedal for rotating the piston in the cylinder, whereby the extent of axial movement of the piston is controlled by the extent of the rotational movement.

12. In a fluid pressure brake system for a vehicle, a brake cylinder for operating the brakes, a fluid pressure cylinder for supplying fluid under pressure to said brake cylinder, a piston rotatably and axially movable with respect to the fluid pressure cylinder, means for applying a force to the piston so as to move it axially of the fluid pressure cylinder in either direction, said fluid pressure cylinder and piston having ports in their peripheries, the cylinder port communicating with the brake cylinder, and the piston port communicating with the fluid pressure cylinder chamber, and one of the ports comprising slanting peripheral grooves, said grooves being separated by a distance substantially great enough so that the other port may be disposed between them without having appreciable communication with either, and a brake pedal for rotating the piston in the fluid pressure cylinder.

13. In a fluid pressure brake system for a vehicle, a brake cylinder for operating the brakes, a fluid pressure cylinder for supplying fluid under pressure to said brake cylinder, a piston axially movable with respect to the fluid pressure cylinder, means for applying a force to the piston so as to move it in either direction axially of the fluid pressure cylinder, said fluid pressure cylinder and piston having ports on their peripheries, the cylinder port being in communication with the brake cylinder, the piston port communicating with the fluid pressure cylinder chamber, and with the periphery of the piston, whereby upon movement of the piston to a proper position in the fluid pressure cylinder, the port openings may be interrupted, a common means for manually controlling the direction of the force applied to move the piston axially, and for varying the cooperative relationship between the ports in the fluid pressure cylinder and the piston, whereby any selected degree of movement of the piston in the fluid pressure cylinder may be provided.

14. In a fluid pressure brake system for a vehicle, a brake cylinder for operating the brakes, a fluid pressure cylinder for supplying fluid under pressure to said brake cylinder, a piston rotatably and axially movable with respect to the fluid pressure cylinder, means for applying a force to the piston in either direction so as to move it axially of the fluid pressure cylinder, said fluid pressure cylinder and piston having cooperating ports in their peripheries, the cylinder port being in communication with the brake cylinder, and the piston port communicating with the fluid pressure cylinder chamber, one of said ports comprising a slanting peripheral groove, said groove cooperating with the other port, and a common means for controlling the direction of the force applied to move the piston axially, and for rotating the piston in the cylinder, whereby the extent and direction of axial movement of the piston is controlled.

15. In a fluid pressure brake system for a vehicle, a brake cylinder for operating the brakes, a fluid pressure cylinder for supplying fluid under pressure to said brake cylinder, a piston rotatably and axially movable with respect to the fluid pressure cylinder, means for applying a force to the piston in either direction so as to move it axially of the fluid pressure cylinder, said fluid pressure cylinder and piston having ports in their peripheries, the cylinder port communicating with the brake cylinder, and the piston port communicating with the fluid pressure cylinder chamber, and one of the ports comprising slanting peripheral grooves, said grooves being separated by a distance substantially great enough so that the other port may be disposed between them without having appreciable communication with either, and a common means for controlling the direction of the force applied to move the piston axially, and for rotating the piston in the cylinder, whereby the extent and direction of axial movement of the piston is controlled.

16. A fluid pressure cylinder having a piston and cooperating ports on the piston and cylinder peripheries, said ports adapted to determine by the interruption of communication between them the extent of axial movement of the piston relative to the cylinder, characterized by the fact that these ports are of such configuration that the point where communication is interrupted depends upon the relative angular positions of the ports.

17. A fluid pressure cylinder having a piston and cooperating ports on the piston and cylinder peripheries, said ports adapted to determine by the interruption of communication between them the extent of axial movement of the piston relative to the cylinder, characterized by the fact that one of these ports comprises a slanting groove, so that the point where communication is interrupted is a function of the relative angular positions of the ports.

18. In a fluid pressure brake for vehicles, fluid pressure actuated means for applying the brake, means for supplying fluid under pressure to said means, power operated means for placing said fluid under pressure, a lever and means connected to said lever for controlling said power operated means and the flow of fluid under pressure to said first named means.

19. In a fluid pressure brake for vehicles, fluid pressure actuated means for applying the brake, means for supplying fluid under pressure to said means, power operated means for placing said fluid under pressure, a lever and means connected to the lever for controlling the flow of fluid under pressure to said first named means, said controlling means operating to permit the flow of an amount of fluid to the said first named means predetermined by the position of said lever.

20. In a fluid pressure brake for vehicles, fluid pressure actuated means for operating the brake, means for creating a fluid pressure for supplying said means, means for driving said fluid pressure creating means, and a single means for controlling the said driving means and the extent of operation of the fluid pressure creating means.

21. In a fluid pressure brake for vehicles, fluid pressure actuated means for operating the brake, means for creating a fluid pressure for supplying said means, a pneumatically operated device for driving the fluid pressure creating means, and a common means for controlling the pneumatically operated device and the pressure created by the fluid pressure creating means.

In testimony whereof, have hereunto set our hands.

JAMES W. SUMNER.
ALDEN G. RAYBURN.